Patented Mar. 28, 1939

2,152,007

UNITED STATES PATENT OFFICE 2,152,007

AZO DYESTUFFS AND THEIR PRODUCTION

Hermann Winkeler, Ludwigshafen-on-the-Rhine, and Erich Fischer, Bad Soden in Taunus, Germany, assignors to General Aniline Works, Inc., New York, N. Y., a corporation of Delaware No Drawing. Application January 21, 1935, Serial No. 2,796. In Germany January 31, 1934

10 Claims. (Cl. 260—162)

This invention relates to new azo dyestuffs and a process of producing same.

We have found that valuable azo dyestuffs capable of being converted in substance or on the fiber into complex compounds are obtained by coupling with coupling components diazo compounds of amines of the general formula:

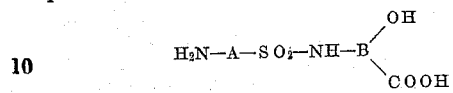

in which A stands for the radicle of an aromatic hydrocarbon which may also contain substituents selected from the group consisting of a halogen atom, the NO₂— and an —O-alkyl group, B stands for a hydrocarbon radicle of the benzene series containing the hydroxy group in 2-position with reference to the carboxylic group in 1-position and which in the 5-position may contain a methyl group or a substituent selected from the group consisting of the halogen, —NO₂, and —SO₃H group, the said hydrocarbon radicle of the benzene series being attached to the sulfonyl amide-grouping in the 3-position to the carboxylic group.

Suitable amines of the said kind are, for example, N-(3'-aminobenzene-sulfonyl)-3-amino-2-hydroxybenzene-1-carboxylic acid, N-(3'-aminobenzene-sulfonyl)-3-amino-2-hydroxy-5-sulfobenzene 1-carboxylic acid, N-(3'-amino-6'-methylbenzene-sulfonyl)-3-amino-2-hydroxy-5-sulfobenzene-1-carboxylic acid, N-(4'-amino-3'-chlorobenzene-sulfonyl)-3-amino-2-hydroxy-5-sulfobenzene-1-carboxylic acid, N-(3'-amino-4'-methoxybenzene-sulfonyl)-3-amino-2-hydroxy-5-sulfobenzene-1-carboxylic acid, N-(3'-aminobenzene-sulfonyl)-3-amino-2-hydroxy-5-nitrobenzene-1-carboxylic acid, N-(3'-amino-6'-methylbenzene-sulfonyl)-3-amino-2-hydroxy-5-methylbenzene-1-carboxylic acid.

The dyestuffs obtainable according to the invention from aminosulfonyl compounds of ortho-aminosalicylic acids yield complex chromium compounds which have good properties as regards fastness to light, washing, fulling, rubbing and alkali. The dyestuffs themselves as well as their complex chromium compounds have a very good levelling power.

The following examples will further illustrate the nature of this invention but the invention is not restricted to these examples. The parts are by weight.

Example 1

388 parts of N-(3'-amino-benzene-sulfonyl)-3-amino-2-hydroxy-5-sulfo benzene-1-carboxylic acid are dissolved in 2000 parts of water with an addition of sodium carbonate and mixed with 69 parts of sodium nitrite. The whole is allowed to flow into diluted hydrochloric acid at room temperature. The separated white-gray diazo compound is then carried into an ice-cooled solution of 103 parts of 3-methyl-5-pyrazolone rendered alkaline with sodium bicarbonate. At the end of the coupling the dyestuff, being already partly separated, is totally salted out and filtered by suction. The dyestuff dyes wool very uniformly yellow shades with a tint of green which yields dyeings very fast to light, washing and fulling by aftertreatment with chromium salts. The complex chromium compound of the dyestuff obtained by treating the dyestuff in substance with agents supplying chromium has quite an excellent levelling power and yields on animal fibers dyeings of good fastness to light, washing and fulling.

Using the diazo compound of N-(3'-amino-6'-methylbenzene-sulfonyl)-3-amino-2-hydroxy-5-sulfobenzene-1-carboxylic acid or N-(4'-amino-3'-chlorobenezene-sulfonyl)-3-amino-2-hydroxy-5-sulfobenzene-1-carboxylic acid instead of the above mentioned diazo compound, dyestuffs of similar properties are obtained. These diazo compounds when coupled with other pyrazolones than 3-methyl-5-pyrazolone, for example 1-phenyl-3-methyl-5-pyrazolone or 1-(2'-chlorophenyl)-3-methyl-5-pyrazolone, yield dyestuffs which dye more reddish shades of better fastness to washing and fulling than those obtained by coupling the said diazotized amines with 3-methyl-5-pyrazolone.

Example 2

322 parts of N-(3'-amino benzene-sulfonyl)-3-amino-2-hydroxy-5-methylbenzene-1-carboxylic acid are diazotized as described in Example 1 and the diazo compound is coupled with 1-(2'-chloro-5'-sulfophenyl)-3-methyl-pyrazolone in a solution rendered alkaline with sodium carbonate. The dyestuff separated by salting out with common salt dyes wool shades which by aftertreatment with agents supplying chromium yield brown-yellow dyeings of very good properties as regards fastness, the chromium complex compound of the dyestuff obtained by treating the dyestuff in substance with chromium salts dyes wool and silk very uniformly greenish-yellow shades of very good fastness to light and good fastness to washing and fulling.

Using N-(3'-amino-6'-methylbenzene-sulfonyl)-3-amino-2-hydroxy-5-methylbenzene-1-carboxylic acid for the diazo compound, dyestuffs of similar properties are obtained. By coupling the said diazo compounds with sulfonated pyrazolones free from halogen the azo dyestuffs obtained dye somewhat more reddish shades.

*Example 3*

388 parts of N-(3'-aminobenzene-sulfonyl)-3-amino-2-hydroxy-5-sulfobenzene-1-carboxylic acid are diazotized as described in Example 1 and coupled with 2.4-dihydroxy-quinoline in a solution rendered alkaline with sodium carbonate. The dyestuff obtained yields on wool and silk, either by after-treatment of the dyeing on the fiber with agents supplying chromium or by dyeing with the complex chromium compound of the dyestuff, yellow shades of good fastness. By coupling the said diazo compound with beta-naphthol or naphthol-sulfonic acids, dyestuffs are obtained which dye orange to red shades. When using resorcinol as coupling compound, a dyestuff is obtained which dyes leather yellow-brown shades having a very good fastness to light.

*Example 4*

308 parts of N-(3'-amino-benzenesulfonyl)-3-amino-2-hydroxy benzene-1-carboxylic acid are diazotized as described in Example 1 and mixed with a solution of 310 parts of 1-(2'-chlor-5'-sulpho-phenyl)-3-methyl-5-pyrazolone rendered alkaline with sodium bicarbonate. The dyestuff is isolated by salting out and dyes wool yellow shades. By after-treatment with chromium salts yellow dyeings of good fastness to washing and fulling are obtained. The chromium compound obtained by chroming the dyestuff itself dyes wool and silk very uniformly yellow shades of good fastness to washing and fulling.

What we claim is:

1. The process for the production of azo dyestuffs capable of being converted in substance or on the fiber into complex metal compounds comprising coupling azo dyestuff components selected from the group consisting of pyrazolones, hydroxyquinolines and phenols with diazo compounds of amines of the general formula:

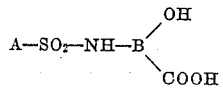

in which A stands for aromatic radicle selected from the group consisting of arylamines, alkylarylamines, nitroarylamines and alkoxyarylamines, B stands for a hydrocarbon radicle of the benzene series containing the hydroxy group in the 2-position with reference to the carboxylic group in the 1-position and which contains in the 5-position a member of the group consisting of hydrogen, alkyl, the NO₂— and —SO₃H group, the said hydrocarbon radicle of the benzene series being attached to the sulfonyl-amide grouping in the 3-position with reference to the carboxylic acid group.

2. The process for the production of azo dyestuffs capable of being converted in substance or on the fiber into complex metal compounds comprising coupling azo dyestuff components selected from the group consisting of pyrazolones, hydroxyquinolines and phenols with diazo compounds of amines of the general formula:

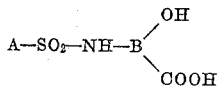

in which A stands for an aromatic radicle selected from the group consisting of arylamines, halogenarylamines, alkylarylamines, nitroarylamines and alkoxyarylamines, which radicle is attached to the sulfonyl group in the meta-position with reference to the amino group, B stands for a hydrocarbon radicle of the benzene series containing the hydroxy group in the 2-position with reference to the carboxylic group in the 1-position and which contains in the 5-position a member of the group consisting of hydrogen, alkyl, the NO₂— and —SO₃H group, the said hydrocarbon radicle of the benzene series being attached to the sulfonyl-amide grouping in the 3-position with reference to the carboxylic acid group.

3. The process for the production of azo dyestuffs capable of being converted in substance or on the fiber into complex metal compounds comprising coupling azo dyestuff components selected from the group consisting of pyrazolones, hydroxyquinolines and phenols with diazo compounds of amines of the general formula:

$$A-SO_2-NH-B\diagdown_{COOH}^{OH}$$

in which A stands for an aromatic radicle selected from the group consisting of arylamines, halogenarylamines, alkylarylamines, nitroarylamines and alkoxyarylamines, B stands for a hydrocarbon radicle of the benzene series containing the hydroxy group in the 2-position with reference to the carboxylic group in the 1-position and an alkyl group in the 5-position, the said hydrocarbon radicle of the benzene series being attached to the sulfonyl-amide grouping in the 3-position with reference to the carboxylic acid group.

4. The process for the production of azo dyestuffs capable of being converted in substance or on the fiber into complex metal compounds comprising coupling azo dyestuff components selected from the group consisting of pyrazolones, hydroxyquinolines and phenols with diazo compounds of amines of the general formula:

$$H_2N-A-SO_2-NH-B\diagdown_{COOH}^{OH}$$

in which A stands for the radicle of an aromatic hydrocarbon containing an alkyl group, B stands for a hydrocarbon radicle of the benzene series containing the hydroxy group in the 2-position with reference to the carboxylic group in the 1-position and which contains in the 5-position a member of the group consisting of hydrogen, alkyl, the NO₂— and SO₃H group, the said hydrocarbon radicle of the benzene series being attached to the sulfonyl-amide grouping in the 3-position with reference to the carboxylic acid group.

5. The process for the production of azo dyestuffs capable of being converted in substance or on the fiber into complex metal compounds comprising coupling azo dyestuff components selected from the group consisting of pyrazolones, hydroxyquinolines and phenols with diazo compounds of amines of the general formula:

$$A-SO_2-NH-B\diagdown_{COOH}^{OH}$$

in which A stands for an aromatic radicle selected from the group consisting of arylamines, halogenarylamines, alkylarylamines, nitroarylamines and alkoxyarylamines, B stands for a hydrocarbon radicle of the benzene series containing the hydroxy group in the 2-position with reference to the carboxylic group in the 1-position and in the 5-position a sulfonic acid group, the said hydrocarbon radicle of the benzene series being attached to the sulfonyl-amide grouping in the 3-position with reference to the carboxylic acid group.

6. The process for the production of azo dyestuffs capable of being converted in substance or on the fiber into complex metal compounds comprising coupling pyrazolones with diazo compounds of amines of the general formula:

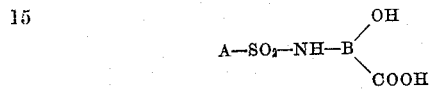

in which A stands for an aromatic radicle selected from the group consisting of arylamines, halogenarylamines, alkylarylamines, nitroarylamines and alkoxyarylamines, B stands for a hydrocarbon radicle of the benzene series containing the hydroxy group in the 2-position with reference to the carboxylic group in the 1-position and which contains in the 5-position a member of the group consisting of hydrogen, alkyl, the $NO_2-$ and $-SO_3H$ group, the said hydrocarbon radicle of the benzene series being attached to the sulfonyl-amide grouping in the 3-position with reference to the carboxylic acid group.

7. Azo dyestuffs corresponding to the general formula:

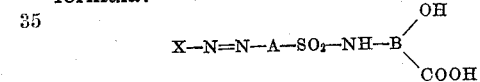

in which A stands for a radicle selected from the group consisting of aromatic hydrocarbons, halogensubstituted aromatic hydrocarbons, aromatic nitrohydrocarbons and alkoxysubstituted aromatic hydrocarbons, B stands for a hydrocarbon radicle of the benzene series containing the hydroxy group in the 2-position with reference to the carboxylic group in the 1-position and which contains in the 5-position a member of the group consisting of hydrogen, alkyl, the $NO_2-$ and $-SO_3H$ group, the said hydrocarbon radicle of the benzene series being attached to the sulfonyl-amide grouping in the 3-position with reference to the carboxylic acid group, and wherein X represents a coupling component selected from the group consisting of pyrazolones, hydroxyquinolines and phenols.

8. Azo dyestuff corresponding to the formula:

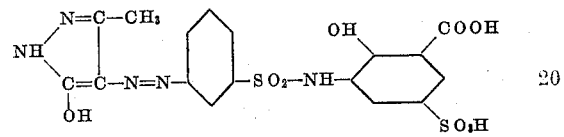

9. Azo dyestuff coresponding to the formula:

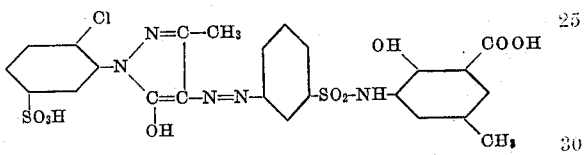

10. Azo dyestuff coresponding to the formula:

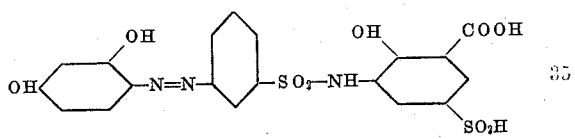

HERMANN WINKELER.
ERICH FISCHER.